(12) United States Patent
Ahmadi

(10) Patent No.: US 7,195,093 B1
(45) Date of Patent: Mar. 27, 2007

(54) FUEL DOOR ACTUATED IGNITION CUT OFF

(76) Inventor: Faryab Ahmadi, 25 Pickering Ct., Germantown, MD (US) 20874

( * ) Notice: Subject to any disclaimer, the term of this patent is extended or adjusted under 35 U.S.C. 154(b) by 334 days.

(21) Appl. No.: 10/861,630

(22) Filed: Jun. 7, 2004

(51) Int. Cl.
*B60K 28/10* (2006.01)
*B60K 28/00* (2006.01)
*B60K 15/05* (2006.01)

(52) U.S. Cl. ............... 180/286; 180/287; 296/97.22; 307/10.1

(58) Field of Classification Search ............... 180/271, 180/283, 286, 287; 296/97.22; 307/10.1, 307/10.6
See application file for complete search history.

(56) References Cited

U.S. PATENT DOCUMENTS

| | | | |
|---|---|---|---|
| 3,572,305 A * | 3/1971 | Moragne | 123/146.5 R |
| 3,878,507 A * | 4/1975 | Medlock | 340/426.24 |
| 4,700,801 A * | 10/1987 | Ailing | 180/287 |
| 5,004,023 A | 4/1991 | Monticup, Jr. et al. | |
| 5,329,164 A | 7/1994 | Saito | |
| 5,720,327 A | 2/1998 | Foster, Jr. | |
| 6,011,484 A * | 1/2000 | Dietl et al. | 340/5.31 |
| 6,021,623 A | 2/2000 | Hale | |
| 6,112,714 A | 9/2000 | Brister | |
| 6,334,474 B1 | 1/2002 | Rababy et al. | |
| 2003/0062210 A1 * | 4/2003 | Farmer | 180/286 |
| 2003/0222476 A1 * | 12/2003 | Park | 296/97.22 |

* cited by examiner

*Primary Examiner*—Paul N. Dickson
*Assistant Examiner*—George D. Spisich

(57) ABSTRACT

A fuel door actuated ignition cut off includes a switch that is electrically coupled to the circuit for selectively opening or closing the circuit. An actuator is mechanically coupled to the switch for selectively actuating the switch. The circuit is open when the actuator is in an open position and the circuit is closed when the actuator is in a closed position. The switch is mounted on an inner surface of a vehicle wall. The switch is positioned generally adjacent to a fuel door of the vehicle. An arm is attached to an inner surface of the door and is adapted for engaging the actuator such that the actuator is moved to the open position when the door is opened.

3 Claims, 2 Drawing Sheets

FUEL DOOR ACTUATED IGNITION CUT OFF

BACKGROUND OF THE INVENTION

1. Field of the Invention

The present invention relates to ignition cut off devices and more particularly pertains to a new ignition cut off device for cutting the power between an ignition when a fuel door is opened so that the engine will be turned off when a person fuels the vehicle.

2. Description of the Prior Art

The use of ignition cut off devices is known in the prior art. U.S. Pat. No. 6,112,714 describes a device that engages a fuel cap for turning a motor off when the fuel cap has been removed. Another type of ignition cut off device is U.S. Pat. No. 5,720,327 that includes a circuit breaker for an ignition which is mounted within a fuel filling conduit of a vehicle. The circuit breaker prevents the operation of the vehicle if a gas filling nozzle is extending into the conduit, and thus prevents the accidental driving away from a gas pump with the nozzle extending into the conduit.

While these devices fulfill their respective, particular objectives and requirements, the need remains for a system and method that includes a fuel door actuated cut off switch which breaks a circuit between the ignition and the engine so that that engine turns off when the fuel door is opened.

SUMMARY OF THE INVENTION

The present invention meets the needs presented above by generally comprising a switch that is electrically coupled to the circuit for selectively opening or closing the circuit. An actuator is mechanically coupled to the switch for selectively actuating the switch. The circuit is open when the actuator is in an open position and the circuit is closed when the actuator is in a closed position. The switch is mounted on an inner surface of a vehicle wall. The switch is positioned generally adjacent to a fuel door of the vehicle. An arm is attached to an inner surface of the door and is adapted for engaging the actuator such that the actuator is moved to the open position when the door is opened.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
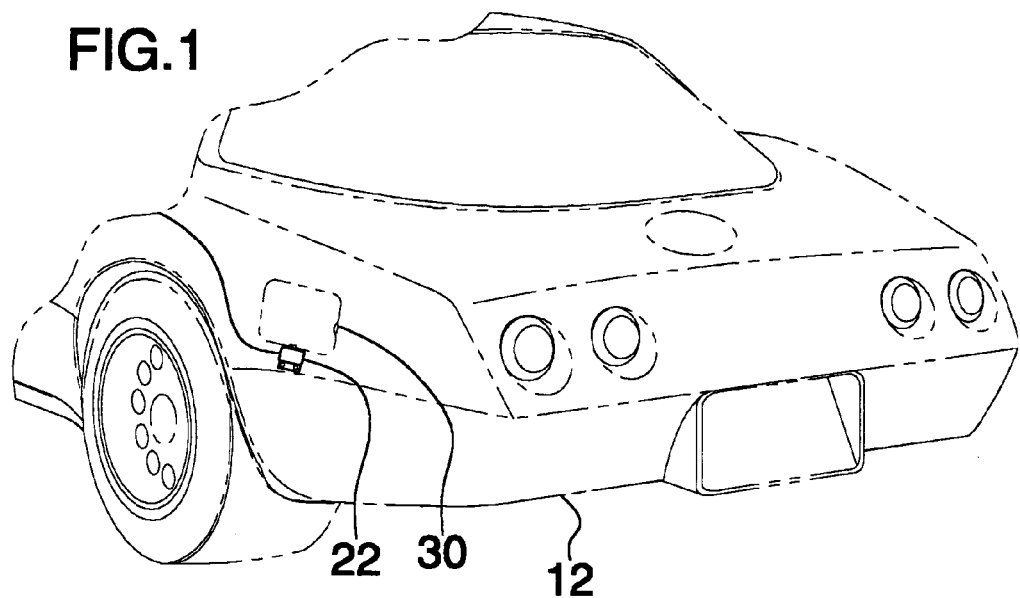
FIG. 1 is a perspective in-use view of a fuel door actuated ignition cut off according to the present invention.
Figure 2:
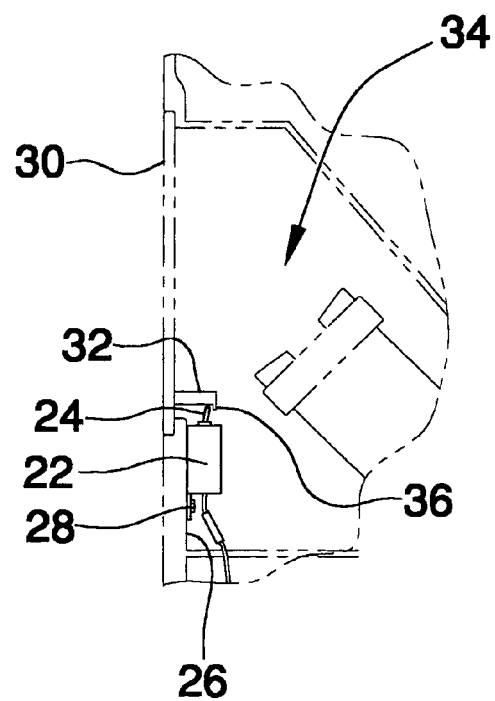
FIG. 2 is a side in-use view of the present invention.
Figure 3:
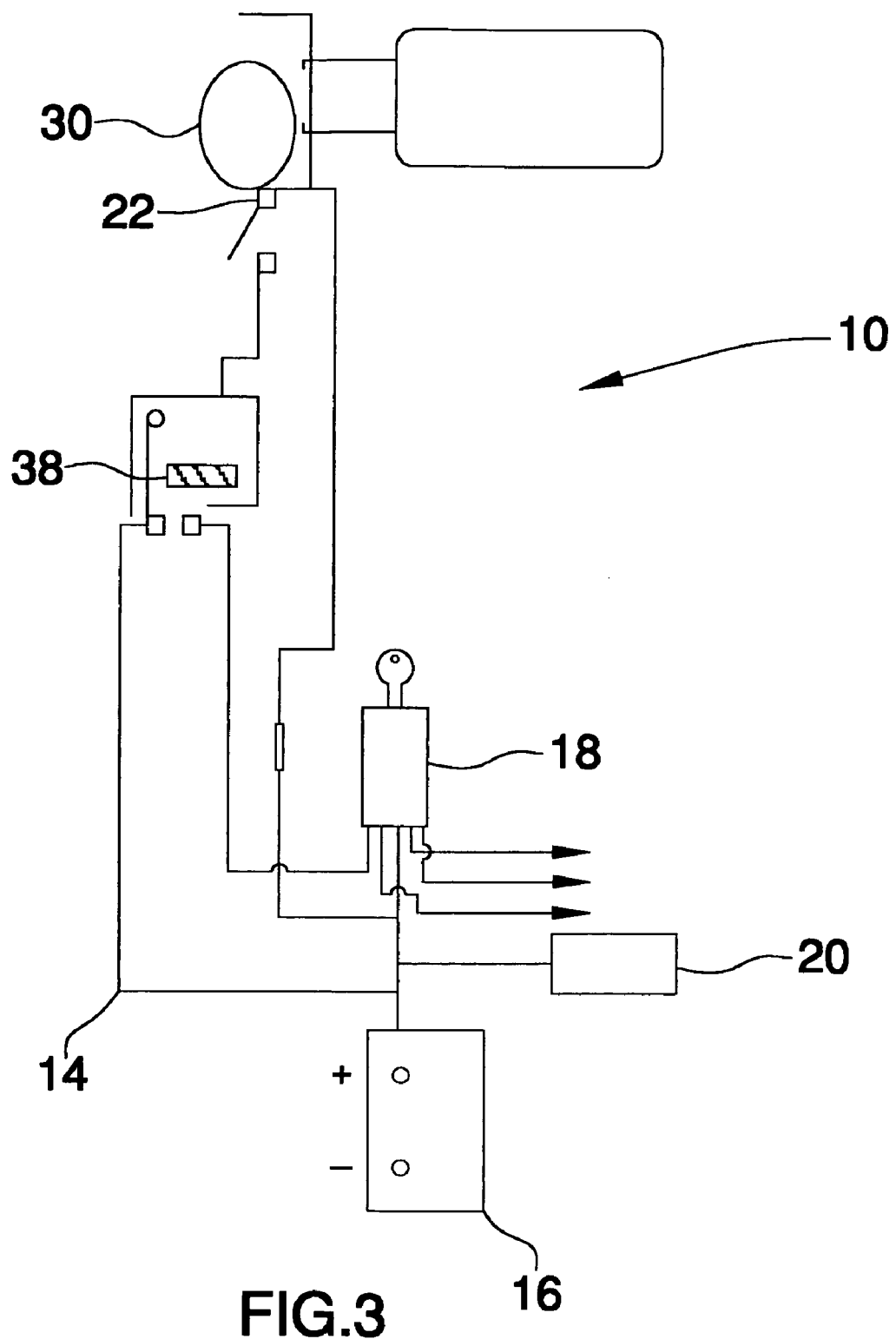
FIG. 3 is an electronic schematic view of the present invention.

With reference now to the drawings, and in particular to FIGS. 1 through 3 thereof, a new ignition cut off device embodying the principles and concepts of the present invention and generally designated by the reference numeral 10 will be described.

As best illustrated in FIGS. 1 through 3, the fuel door actuated ignition cut off 10 generally comprises a power interruption system for a vehicle 12 for selectively breaking a circuit 14 between a battery 16 and an ignition 18 of the vehicle 12. The circuit 14 is electrically coupled to the starter 20 of the vehicle 12. When the circuit 14 is broken, or opened, the vehicle 12 will turn off as though the ignition 18 has been actuated to turn the vehicle 12 off. Additionally, with the circuit 14 open, a driver of the vehicle 12 would not be able to turn the vehicle 12 back on.

The ignition cut off 10 comprises a switch 22 that is electrically coupled to the circuit 14 for selectively opening or closing the circuit 14. An actuator 24 is mechanically coupled to the switch 22 for selectively actuating the switch 22. The circuit 14 is open when the actuator 24 is in an open position and the circuit 14 is closed when the actuator 24 is in a closed position. The actuator 24 is ideally a toggle actuator. This allows a user to selectively toggle the actuator 24 during an emergency situation to close the circuit 14. The switch 22 is mounted on an inner surface 26 of a vehicle wall with conventional fasteners 28 and is positioned generally adjacent to a fuel door 30 of the vehicle 12. The actuator 24 extends into a portal of the fuel door 30 opening.

An arm 32 is attached to an inner surface of the door 30. The arm 32 extends into a fuel portal 34 of the vehicle 12. The arm 30 has a free end and a flange 36 is attached to the free end of the arm 30. The actuator 24 is positioned such that the flange 36 engages the actuator 24 when the door 30 is opened or closed. The flange 36 pulls the actuator 24 into the open position when the door 30 is opened and pushes the actuator 24 into the closed position when the door 30 is closed. The actuator 24 and the flange 36 are each preferably comprised of a plastic or metal material so that the flange 36 slides past the actuator after pushing or pulling the actuator 24. This will place the flange 36 in a position to again engage the actuator 24.

The system of the current ignition cut-off 10 may be used in conjunction with a vehicle's detection relay 38 which is already electrically coupled to the vehicle 12 for determining if the fuel door 30 is open. The detection relay 38 may be used to verify that the door 30 is open so that the relay 38 will open the circuit 14 if it does not detect that the door 30 is open.

In use, the ignition cut off 10 and method prevents a person from filling their gas tank while the vehicle's engine is running. This aids in the prevention of explosions and fires that can be attributed to filling a gas tank while the vehicle 12 is turned on.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A power interruption system for a vehicle for selectively breaking a circuit between a battery and an ignition of the vehicle, said system comprising:

a switch being electrically coupled to the circuit for selectively opening or closing the circuit, an actuator being mechanically coupled to the switch for selectively actuating said switch, wherein the circuit is open when said actuator is in an open position and said circuit is closed when said actuator is in a closed position, said switch being mounted on an inner surface of a vehicle wall, said switch being positioned generally adjacent to a fuel door of the vehicle; and an arm being attached to an inner surface of the door, said arm extending into a fuel portal of the vehicle, said arm having a free end, a flange being attached to said free end of said arm, said actuator being positioned such that said flange engages said actuator when the door is opened or closed, wherein said flange pulls said actuator into said open position when the door is opened and pushes said actuator into said closed position when the door is closed.

2. The system according to claim 1, wherein said actuator comprises a toggle actuator.

3. A method for selectively breaking a circuit between a battery and an ignition of a vehicle comprising the steps of:

providing a switch being electrically coupled to the circuit for selectively opening or closing the circuit, an actuator being mechanically coupled to the switch for selectively actuating said switch, wherein the circuit is open when said actuator is in an open position and said circuit is closed when said actuator in a closed position;

mounting said switch on an inner surface of a vehicle wall and positioning said switch generally adjacent to a fuel door of the vehicle; and attaching an arm to an inner surface of the door such that said arm extends into a fuel portal of the vehicle, said arm having a free end, a flange being attached to said free end of said arm, said actuator being positioned such that said flange engages said actuator when the door is opened or closed;

opening the door and pulling said actuator into said open position by said flange; and closing the door and pushing said actuator into said closed position by said flange.

* * * * *